United States Patent [19]

Buros

[11] 4,060,711
[45] Nov. 29, 1977

[54] DOCUMENT CARRIER

[75] Inventor: Melvin S. Buros, Phoenix, Ariz.

[73] Assignee: Micr-Shield Company, Phoenix, Ariz.

[21] Appl. No.: 614,332

[22] Filed: Sept. 17, 1975

[51] Int. Cl.² .......................................... G06K 19/00
[52] U.S. Cl. ..................................... 235/488; 283/58; 235/493
[58] Field of Search .................. 40/2.2, 158 R, 125 A; 283/58, 57; 235/61.12 M, 61.12 R, 61.12 N; 229/68, 72; 428/331, 446

[56] References Cited

U.S. PATENT DOCUMENTS

| | | | |
|---|---|---|---|
| 3,363,917 | 1/1968 | Gunderson et al. | 283/58 |
| 3,431,404 | 3/1969 | Brink | 283/58 X |
| 3,588,456 | 6/1971 | McNabb | 235/61.12 M |
| 3,702,924 | 11/1972 | Wood et al. | 283/58 X |
| 3,736,685 | 6/1973 | Shibata | 40/158 R |
| 3,798,111 | 3/1974 | Lane et al. | 428/331 X |
| 3,800,124 | 3/1974 | Walsh | 235/61.12 M X |

Primary Examiner—John F. Pitrelli
Attorney, Agent, or Firm—Cahill, Sutton & Thomas

[57] ABSTRACT

A document carrier is described comprising a flat sheet of unfilled parchment having one side thereof coated with a cohesive material. The opposite side of the sheet is printed along at least one edge thereof with a filler material. An erroneously encoded magnetic ink character recognition document, or other document such as a multilated check, to be machine processed is positioned on the cohesive side of the translucent sheet and the latter is subsequently folded over the document with the cohesive surfaces surrounding the document mating to encase the document. The document, thus encased, is firmly held in position between the folded layers of the parchment by the bonding of the cohesive layers to each other; the edge printed with a filler material forms a clear band along the bottom edge of the carrier for receiving encoding magnetic ink.

9 Claims, 4 Drawing Figures

DOCUMENT CARRIER

The present invention pertains to devices for permitting the re-encoding of magnetic ink character recognition (MICR) information. More specifically, the invention pertains to a device for carrying a mutilated document, an erroneously encoded document or similar document, and for providing a predetermined area for the receipt of correctly encoded MICR information.

Data processing systems may be utilized through the expediency of numerous types of input/output equipment; the basic purpose of such equipment is to place the information to be provided to the data processor in an appropriate form for machine reading. The source documents containing the information to be supplied to the data processing system may be encoded in machine readable form so that automatic reading equipment can sense the information, translate the information into appropriate electrical form for utilization by the processor. One such document encoding system used by many organizations, most notably banks, is the magnetic coding of information on the document. For example, checks have been essentially standardized in size and format so that they may be processed utilizing automatic reading and sorting equipment. To this end, checks have been standardized incorporating a "clear band" extending along the bottom of the check in which certain information is placed in machine readable form.

The information placed in the clear band is standardized and referred to as MICR characters. These characters appear on the bottom of the check as printed numbers and symbols which have been printed in an ink containing magnetizable particles therein; when the information contained on the document is to be "read", the document is passed through a sorter/reader which first magnetizes the magnetizable particles and then detects the magnetic field of the symbols resulting from the magnetic retentivity of the ink. The characters and symbols placed in the clear band are generally segregated into three separate fields. The first of these fields ("transit field") will contain the appropriate symbols and characters to identify a bank, bank branch, etc. The second field ("on us field") will contain the account number affected by the transaction. These first two fields will typically be "pre-encoded"; that is, they will be placed on the check before the bank sends the check to the customer for his use.

The third field ("amount field") obviously cannot be pre-encoded since the amount for which the check is drawn will not be known until it is used. Accordingly, after the check has been presented to the bank for payment and is to be processed through its various data processing systems, the amount of the check must be encoded at the appropriate location on the clear band prior to the introduction of the document to a sorter/reader. This latter step in the encoding of a check is commonly referred to as "post encoding" and is typically accomplished with special encoding machines having a keyboard operated by an individual who observes the amount of the check and encodes the amount in MICR characters in the amount field of the clear band.

Since post encoding is performed by human operators, it is not uncommon for errors to occur and for the wrong amount to be post encoded in the clear band. There are several techniques presently in use for correcting the problems caused by such erroneous encoding. One such technique is the utilization of an envelope in which the erroneously encoded document or check is placed; the correct MICR coding is then post-printed along the bottom of the envelope and the envelope is thereafter processed with the erroneously encoded document being carried thereby through the processing equipment. These techniques are also used when the document is mutilated and cannot be handled by the automatic equipment. Similarly, certain conditions may present themselves with respect to a document such that new or additional encoded information is required; these types of documents, known in the banking industry as "exception items", lend themselves to the use of carrier envelopes.

Prior art devices for carrying erroneously encoded documents such as checks and exception items usually take the form of envelopes and have several disadvantages. Since the erroneously encoded MICR characters must be supported sufficiently above the lower edge of the carrier so that the reading equipment will not be affected by the MICR characters on the document, prior art carriers are constructed having a pocket that supports the document substantially above the lower edge of the envelope; further, the envelope extends downwardly from the pocket to provide a new "clear band" which is used to receive correctly encoded MICR characters. The envelope thus encoded, with the document therein, is then processed in the document handling machinery. Since the machinery, such as a sorter/reader, may handle documents at a rate of 3,000 documents or more per minute, the acceleration and deceleration imparted to the envelopes create significant problems. For example, the envelopes characteristically have one open end or an open top to permit the document to be inserted; during the processing the documents sometimes "fly" out of the envelopes.

When the envelopes with the documents therein are accelerated through contact therewith by a belt or rotating drum, air pockets created within the envelope can sometimes cause wrinkling or tearing of the envelope with a resulting jam in the document handling equipment. When the envelopes are sorted by the equipment into "bins", they are subjected to violent deceleration forces which sometimes cause "fliers" and damage to the envelopes.

Documents such as checks are typically photographed on microfilm to provide a permanent record for the bank prior to returning the check to the customer. The check is preferably microfilmed on both sides, although in extenuating circumstances (such as when some prior art carrier envelopes are utilized), the bank will be satisfied with microfilming only the front face of the check. To facilitate the rapid and automatic microfilming of the checks, the envelopes should at least be translucent. That is, they should permit identification of the information on the front of a check without having to remove the check from the envelope. To meet this requirement, prior art carrier envelopes sometimes resort to a clear plastic front surface on the envelope; unfortunately, the clear plastic materials cannot receive and support all of the magnetic inks used for encoding; thus, the front surfaces of these prior art carrier envelopes must include a back surface that extends below the clear plastic front surface to receive the encoding magnetic ink. Utilization of the clear plastic also presents another problem: unless the plastic is so thick as to be economically unfeasible, it is not sufficiently stiff to withstand the longitudinal accelerations imparted the envelope during processing. Therefore, the back surface of such envelopes is usually formed from a relatively heavy paper. However, the paper is opaque and will not permit microfilming of the back of the check. Also, some documents go through an optical character recognition device which uses a heat-producing, quartz-iodide lamp that causes differential expansion and contraction of the clear plastic top material resulting in buckled or warped carriers that can possibly jam automatic equipment.

The several requirements of a document carrier in the environment of automatic handling and processing machinery, namely, the necessity to see through the carrier for microfilming, the requirement of a suitable surface for receiving and supporting all magnetic inks, sufficient strength and rigidity to withstand document handling acceleration and sufficient toughness to prevent ripped seams when encountering separating mechanisms, together with the necessity of avoiding air pockets and "fliers" have militated against the complete acceptance of prior art document carriers.

It is therefore an object of the present invention to provide a document carrier that will receive and support a document during document processing.

It is another object of the present invention to provide a document carrier that will support a document during automatic processing while permitting both the front and rear faces of the document to be microfilmed without the removal of the document from the carrier.

It is still another object of the present invention to provide a document carrier for receiving and supporting a document which provides an ink-receiving surface that will properly receive and support all magnetic inks.

It is yet another object of the present invention to provide a document carrier for receiving and supporting a document having sufficient strength and rigidity to withstand the accelerations and decelerations imparted thereto by automatic processing equipment without permitting "fliers" or mutilating air pockets to occur.

These and other advantages of the present invention will become apparent to those skilled in the art as the description thereof proceeds.

Briefly, in accordance with the embodiment chosen for illustration, a document carrier is formed from a flat sheet of translucent material such as parchment. The sheet is perforated along a fold line so that it may be folded to approximately one-half its original area. One surface of the sheet is coated with a cohesive material as more clearly defined herein. The opposite surface of the sheet is printed along at least one edge thereof with a filler material to form a clear band for the receipt of magnetic inks in the form in MICR characters. An erroneously encoded document is placed on the cohesive side of the sheet and is generally centered on half of the sheet. The sheet is then folded along the fold line with the cohesive surfaces of the two halves of the sheets coming into contact on the entire cohesive surface with the exception of that portion covered by the document. The document is thus completely encased in the carrier and is efficiently locked in position and prevented from shifting or moving in the carrier. The parchment is translucent, thus permitting microfilming of both sides of the check while a clear band is provided by the filler printed or otherwise coated along one edge of the carrier.

The present invention may more readily be described by reference to the accompanying drawings in which.

Figure 1:
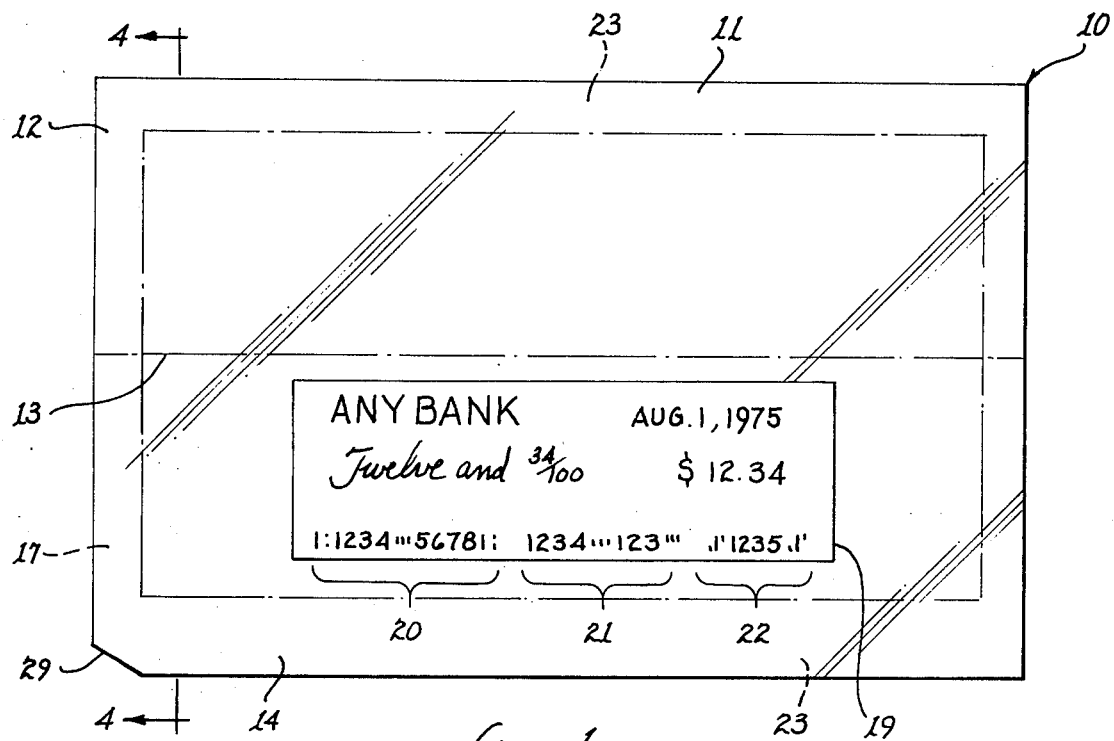
FIG. 1 is a plan view of a document carrier constructed in accordance with the teachings of the present invention showing an erroneously encoded document or check placed thereon.

Referring now to the drawings, the document carrier 10 is shown therein formed from a substantially rectangular sheet 11 of transparent or translucent material. While certain clear plastic materials may be used, the thickness required to provide the necessary rigidity usually militates against its use. I have found that a translucent paper material such as parchment provides satisfactory strength as well as the necessary translucency to permit the viewing of the front and back surfaces of the document to be carried. The parchment used is commercial grade, acid-dipped parchment containing no filler and is not coated. I have found the thickness of the parchment to be preferably 2.5 mils. The sheet 11 is scored or perforated along a fold line 13 to permit the sheet to be folded in half parallel to its longer dimension to form top 12 and bottom 14 halves as shown.

The sheet 11 is coated on one surface thereof with a cohesive material 15. The term cohesive as used herein refers to that type of a coating which is uniquely adhesive unto itself and not adhesive to other types of surfaces. Cohesives are sometimes used in sealing the edges of pieces of paper wherein the cohesive surface will not adhere to another part of the paper but instead will adhere to a correspondingly cohesively coated portion.

The cohesive material utilized in the structure of the present invention is readily commercially available and is applied to the paper in liquid form through the use of a roller. The technique used is well known and need not be discussed here. Basically, the cohesive material is made from a rubber-based compound mixed with a solvent which, when applied in liquid form, subsequently dries with the evaporation of a portion of the solvent leaving a surface which is somewhat "tacky" but nevertheless will not adhere to other surfaces except to a correspondingly cohesively coated surface.

The thickness of the cohesive coating is not critical and need be only thick enough to provide the cohesive action; very thick layers of cohesive material are to be avoided since they may reduce the translucency of the resulting layered structure. I have found that an approximate thickness of .0003 inches performs satisfactorily in the carrier of the present invention.

As mentioned previously, the sheet 11 is formed from an unfilled parchment which provides sufficient strength and rigidity as well as translucency; however, parchment (as well as most clear plastic materials) does not readily receive all magnetic inks. Magnetic ink used for printing MICR characters is usually printed on the receiving surface through the utilization of transfer tapes. Different tapes from the various manufacturers thereof exhibit different characteristics. It is important that the resulting MICR characters have sharply defined edges and be free of voids. Banking industry standards require that the MICR characters have no voids therein greater than a 10 mil square. These stringent requirements, as stated previously, render unfilled parchment surfaces unsuitable. Accordingly, the surface opposite the cohesive coating 15 is provided with a border of a filler 17 to provide a MICR ink receiving surface. While the addition of fillers to the parchment will generally destroy its translucency, the border upon which the filler is placed surrounds the document and does not interfere with the view of the document.

The filler used in the document of the present invention is a commonly used filler of one of a variety of fillers available in the paper industry. Fillers may comprise starch, titanium powder, clay powder, rosins, aquapell, and in this particular instance, the powder is a silica powder that is mixed with a carrier such as printers ink and applied to the document using a flexographic printing process.

The carrier of the filler may be colorless or may be a commercially available printing ink (assuming, of course, that the printing ink does not contain any magnetizable material that would interfere with the magnetizing and reading of the MICR characters). I have found that additional advantages may be obtained by using a black or dark colored ink as the carrier for the filler as will be explained more fully hereinafter. The thickness of the filler is not particularly important and simply mixing the filler with the ink and applying the ink in the above-mentioned commercial printing process is more than adequate.

An erroneously encoded document 19 is shown and includes a transit field 20, an "on us" field 21 and an amount field 22. The fields 20 and 21 are pre-printed on the check but the amount field 22 is post-encoded. It may be noted that the check was drawn for the amount of $12.34 whereas the amount field 22 was erroneously encoded as $12.35. Document 19 is thus erroneously encoded and the document carrier of the present invention is utilized to correct this error and transport the check during automatic document handling procedures. The document or check 19 is positioned as shown in FIG. 1 and may be generally centered on the lower one-half of the sheet 11. The document or check 19 must be positioned above the portion 23 of the border 17 formed along the bottom edge of the sheet 11 since the border will form a clear band for the receipt of the re-encoded information. The positioning of the document or check 19 is not critical and need not be precisely placed; that is, it may be shifted longitudinally or may be moved up or down and may even be placed at an angle with respect to the sheet as long as the check does not intrude on the portion 23 of the border 17.

The sheet 11 is then folded along the fold line 13 and the cohesive coating 15 of the upper and lower halves of the sheet 11 come into contact in those areas surrounding the document 19. The document is thus firmly encased and held in place. The carrier is closed on all sides of the document 19 rendering it impossible for the document to be thrown therefrom. The cohesive material, while not adhering to the document 19, nevertheless contacts the document with a higher coefficient of friction than the uncoated parchment. This higher coefficient of friction prevents relative sliding motion between the surface of the document and the carrier, thus further reducing the possibility of wrinkles or other surface deformation of the carrier during processing.

Figure 2:
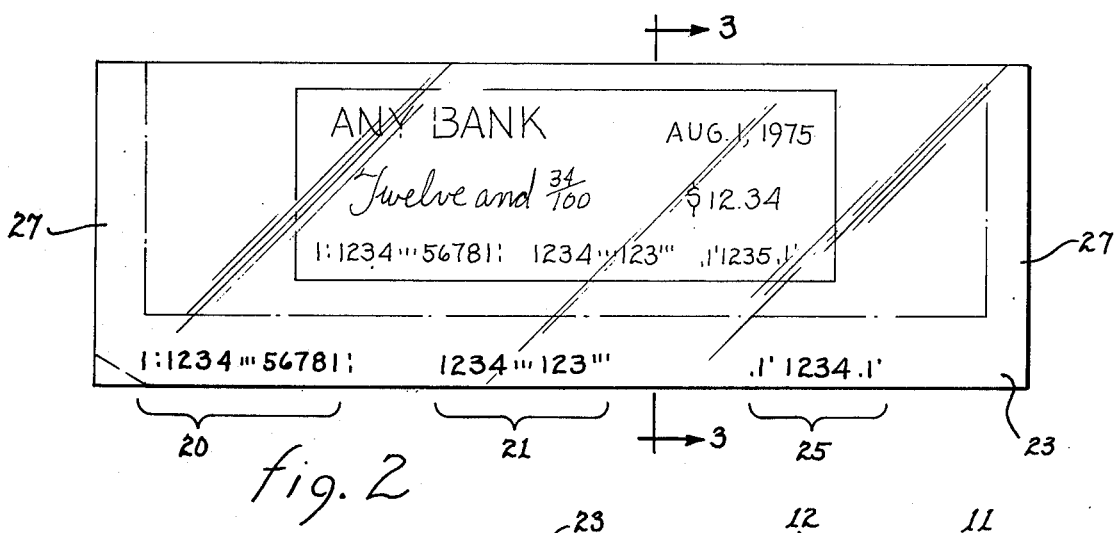
FIG. 2 is a drawing of the document carrier of FIG. 1 shown in its folded condition encasing the erroneously encoded document and showing re-encoded post-printed MICR characters along the clear band thereof.
Figure 3:
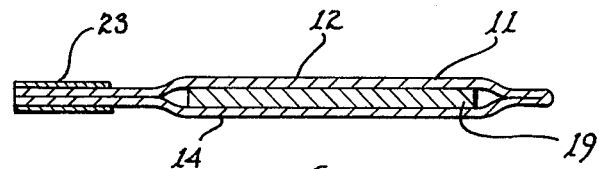
FIG. 3 is a cross-sectional view of FIG. 2 taken along line 3—3.
Figure 4:
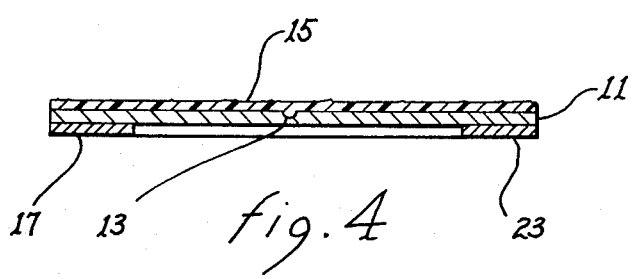
FIG. 4 is a cross-sectional view of FIG. 1 taken along line 4—4.

The sheet 11, on all sides of the document, forms a double-layered structure having no voids or air spaces between the layers; the structure thus exhibits the strength and stiffness of two layers of parchment while presenting only a single layer of parchment on each side of the document 19 and permitting microfilming of both sides of the document. The portion 23 of the border 17 along the bottom edge of the sheet 11 forms a clear band having an exposed surface of magnetic ink-receiving filler. Fields 20 and 21 may be re-encoded in the clear band as shown in FIG. 2. However, the amount field 22 that was erroneously encoded on the document 19 is replaced on the carrier with a properly encoded amount field 25. The carrier 10 with the document 19 encased therein may now be processed in the document handling equipment.

It may be possible to reduce the area covered by the cohesive material; for example, the central portion of each one-half of the sheet 11 may be left uncoated as long as the uncoated portion is smaller than the minimum dimensions of the document the carrier is to encase. If this central portion were left uncoated, the edges of the check or document would nevertheless be locked by the surrounding cohesively coated surfaces. I have found that it is more convenient to completely coat the surface of the sheet 11 to completely avoid the possibility of a document not being firmly encased in the carrier.

As mentioned previously, the border 17 was printed with a black ink containing a filler; while the coloration of the ink is not required for the clear band portion 23 of the border, it is convenient to print the entire border in one step using a pigmented or colored ink. The border, thus colored along the leading or trailing edges 27 of the carrier 10, provides an appropriate media for the detection of the leading edge of the carrier as it passes through the document handling equipment. That is, many document handlers incorporate optical detection techniques for triggering electrical circuits used in the reading/sorting process. The pigmented or colored ink along the edges 27 enable the document carrier 10 to positively trigger such optical detectors; further, colored ink along the portion 23 (or clear band) may also be used to trigger optical sensors in the reading equipment to indicate that the carrier is not skewed with respect to the read heads of the equipment.

A corner 29 of the sheet 11 may be trimmed at any angle as shown in FIG. 1. The corner, thus trimmed, facilitates the separation of the two halves of the sheet 11 cohesively in contact with each other to thereby enable the removal of the document 19 therefrom.

The document carrier of the present invention may be constructed using two separate sheets of cohesively coated translucent material. For example, instead of folding the sheet 11 along a fold line, two sheets corresponding to the two halves of the sheet 11 may each be cohesively coated and may be positioned beneath and on top of the document 19 as shown in FIG. 2. While the embodiment chosen for illustration is preferable in most circumstances, the use of separate sheets lends itself to automated handling of the document carrier during the placement of the document in the carrier.

In use, when a magnetically encoded document such as a check is erroneously encoded, the document is placed on the cohesively coated sheet 11 in a manner described above. The sheet is then folded along the fold line 13 to encase the document to expose a clear band having a magnetic ink-receiving, filler-coated surface. The document carrier with the erroneously encoded document therein is subsequently correctly re-encoded and the combined document and carrier processed in the document handling equipment. The leading edge of the carrier properly trips the optical sensors of the equipment while the translucency of the parchment permits microfilming of both sides of the document or check. The check is firmly held in place in the carrier and is not permitted to separate therefrom during the automatic processing of the carrier. The cohesively bonded, double-layered parchment provides structural rigidity to withstand the acceleration and deceleration encountered in modern document handling equipment. After processing, and if desired, the document may be removed from the document carrier by separating the cohesively adhering layers of parchment; however, the document cannot be removed except by the deliberate action of a person desiring to retrieve the document from the carrier.

I claim:

1. A document carrier for enclosing a document to be machine-processed comprising:
    a. a first single, flat substantially rectangular sheet of material having a layer of cohesive material on one surface thereof, said layer of cohesive material capable of adhering only to a similar layer of cohesive material;
    b. a second single, flat substantially rectangular sheet of material having a layer of said cohesive material on one surface thereof;
    c. said sheets having substantially the same length and width and being sufficiently translucent or transparent to permit optical recognition of the information on said document when it is placed between said sheets;
    d. said cohesive layers surrounding said document and coming into contact with each other and with said document when said sheets are placed on opposite sides of said document to encase said document and to render said document immovable within said carrier, each of said sheets adhering only to each other and not to said document; and
    e. one of said sheets having a magnetic ink-receiving surface along one edge thereof on the surface thereof opposite said cohesive material.

2. The document carrier defined in claim 1, wherein said sheets are translucent.

3. The document carrier defined in claim 1, wherein the sheets are unfilled parchment.

4. The document carrier defined in claim 1, wherein said magnetic ink-receiving surface is a printed band of filler material.

5. The document carrier defined in claim 1, wherein said cohesive material providing an increased coefficient of friction between said sheet and said document to prevent relative motion therebetween when said document is encased.

6. A document carrier for enclosing a document to be machine-processed comprising: a flat substantially rectangular sheet of foldable material having a layer of cohesive material on one surface thereof said layer of cohesive material capable of adhering only to a similar layer of cohesive material; said sheet being sufficiently translucent or transparent to permit optical recognition of the information on said document when said document is placed on the cohesive side of said sheet and said sheet is folded over said document to encase said document and prevent relative movement between said document and said sheet; said sheet when folded being bonded to itself through said cohesive layer on all sides of said document; a magnetic ink-receiving surface along one edge of said material on the surface thereof opposite said cohesive material.

7. The document carrier defined in claim 6, wherein said foldable material is unfilled parchment.

8. The document carrier defined in claim 6, wherein said filler comprises a filler material mixed with a pigmented ink to provide a clear band for receiving MICR characters and to provide a means for triggering optical sensing equipment.

9. The document carrier defined in claim 6, wherein said cohesive material providing an increased coefficient of friction between said sheet and document to prevent relative motion therebetween when said document is encased.

* * * * *